June 25, 1929.  O. C. TRAVER  1,718,500

ELECTRIC RELAY

Original Filed July 29, 1922

Inventor:
Oliver C. Traver,
by
His Attorney.

Patented June 25, 1929.

1,718,500

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

ELECTRIC RELAY.

Original application filed July 29, 1922, Serial No. 578,475. Divided and this application filed June 15, 1925. Serial No. 37,116.

This application is a division of my copending application for Letters Patent of the United States, Serial No. 578,475, filed July 29, 1922, Patent No. 1,563,120, Nov. 24, 1925, which discloses a synchronizing apparatus wherein means comprising a high speed relay are utilized to cause interconnection of two electric circuits when a predetermined relation has been established between their electrical conditions.

My present invention relates more particularly to the high speed relay disclosed in the aforesaid co-pending application, and has for its object the provision of an improved relay device comprising an armature member which is operable to a plurality of different positions, and is so formed as to ensure that it is rapidly moved from one of these positions to another.

My invention will be better understood from the following description when considered in connection with the accompanying drawings, and its scope will be pointed out in the appended claims.

Figure 1:
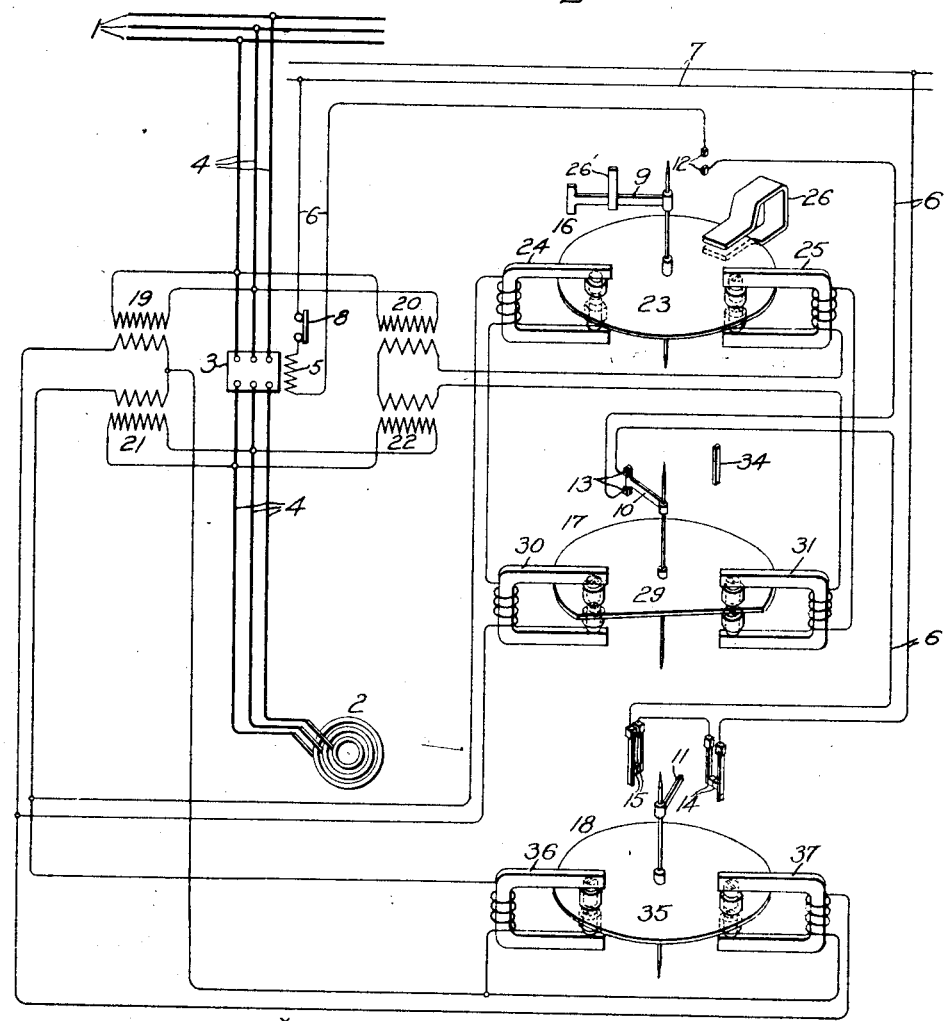
Figure 2:
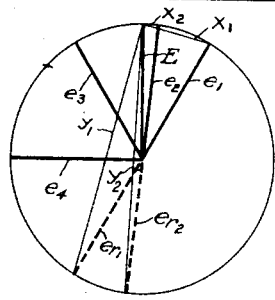

Referring to the drawings, Fig. 1 shows my invention as applied to the synchronizing apparatus disclosed by my aforesaid application; and Fig. 2 is a vector diagram illustrating the operating characteristics of my invention.

Fig. 1 shows an alternating current circuit 1 adapted to be connected to an alternator 2 through a switch 3 and leads 4. The switch 3 is provided with an operating coil 5 arranged to be energized by current supplied from a suitable source through control circuit 6 and bus 7, switch 8 being arranged to interrupt the control circuit when the switch 3 is closed and contact members 9, 10 and 11 being arranged to interrupt this circuit under certain conditions of operation. It will be observed that the contact member 9 is arranged to interconnect a pair of contacts 12 when rotated in one direction and to engage a stop 26' when rotated in the opposite direction; that the contact member 10 is likewise arranged to interconnect contacts 13 when rotated in one direction and to engage a stop 34 when rotated in the opposite direction; and that the contact member 11 is arranged to disengage contacts 14 when rotated in one direction and to disengage contacts 15 when rotated in the other direction.

Rotation of contact members 9, 10 and 11 is produced through means comprising relays 16, 17 and 18, transformers 19 and 21, which are connected to circuit 1, and alternator 2 respectively, in a manner to produce a resultant voltage proportional in value to the vector difference between the circuit and alternator voltages, and transformers 20 and 22 which are connected to circuit 1 and alternator 2 respectively, in a manner to produce a resultant voltage proportional in value to the vector sum of the circuit and alternator voltages.

The relay 16 comprises a disk armature 23, motor element 24 connected to the transformers 19 and 21 in a manner to produce through the armature 23 a torque proportional to the vector difference between the alternator and circuit voltages, motor element 25 connected to the transformers 20 and 22 in a manner to produce through the armature 23 a torque which is opposed to that produced by motor element 24, and is proportional to the vector sum of the alternator and circuit voltages, and a drag magnet 26 provided for damping the movement of the armature 23. The relay 17 comprises a disk armature 29, a motor element 30 connected to transformers 19 and 21 in the same manner as motor element 24 of relay 16, and a motor element 31 connected to transformers 20 and 22 in the same manner as motor element 25 of relay 16. The motor elements 30 and 31 are of the shaded pole type for inducing currents in the armature 29 to control the movement thereof. These elements are arranged to exert opposing torques and each is adapted to exert a unidirectional torque irrespective of the direction of current flow in its winding. The relay 18 comprises an armature 35, a motor element 36 having its coil connected across the secondary circuit of transformer 21, and a motor element 37 connected across the secondary circuit of transformer 19. With these connections the disk armatures 23, 29 and 35 are independently rotated in a clockwise direction when the torques of motor elements 25, 31 and 37 respectively predominate and are rotated in the opposite direction when the torques of motor elements 24, 30 and 36 respectively predominate.

As set forth in my aforesaid copending application, the motor elements 24 and 25 are designed to produce torques by which contact member 9 is moved in opposite directions in response to the production of different predetermined relations between the vector sum and difference of the alternator and circuit voltages, and the motor elements 36 and 37 are designed to produce torques by which contact member 11 is moved in opposite directions in response to the production of different relations between the magnitudes of the alternator and circuit voltages. Since the present invention relates to the relay 17, it will be unnecessary to describe the arrangement and operation of the relays 16 and 18 in further detail.

The disk armature 29 of the relay 17 is so shaped and the shaded poles of the motor elements 30 and 31 are so arranged with respect to the disk 29 that when either of the motor elements predominates to turn the disk 29, the torque of the stronger element is increased while that of the weaker element is decreased. In the illustrated embodiment of the invention, this result is produced by removing a segment of the disk 29 and arranging the shaded poles of the motor elements 30 and 31 so that an increasing area of the disk 29 is presented adjacent the shaded pole faces of the motor element tending to exert the greater torque and a decreasing area of the disk is presented adjacent the pole faces of the motor tending to exert the smaller torque. With this arrangement, movement of the contact member 10 is rapidly accelerated when once initiated and a rapid change in the connections of the control circuit is produced. The manner in which this result is effected will be readily understood upon consideration of Fig. 2.

In Fig. 2, the vector E represents the voltage of the circuit 1, the vectors $e_1$, $e_2$, $e_3$ and $e_4$ represent the voltage of the alternator 2 for different phase relations between alternator and circuit voltages, $e_{r_1}$ and $e_{r_2}$ represent the vectors $e_1$ and $e_2$ respectively, as reversed, $x_1$ represents the vector difference between E and $e_1$, $y_1$ represents the vector sum of vectors E and $e_1$, $x_2$ represents the vector difference between E and $e_2$ and $y_2$ represents the vector sum of E and $e_2$.

The position $e_1$ of the circuit voltage vector corresponds to the parts in position, as shown in Fig. 1. In this position more of the disk 29 is adjacent the pole faces of motor element 30 than is adjacent the pole faces of motor element 31. Motor element 30 then predominates to hold disk 29 in circuit closing position. As voltage $e$ moves to substantially phase coincidence, that is, position $e_2$, voltage $x$ decreases to $x_2$ and voltage $y$ increases to $y_2$ and motor element 31 then predominates to move disk 29 quickly to circuit opening position. According to my invention, the particular position of $e_2$ is preferably, for practical purposes, just before phase coincidence as this allows somewhat for the time necessary to close the circuit controlling means 3. In a practical embodiment of my invention, motor element 31 is constructed to predominate when voltages $x$ and $y$ reach substantially the values 20 and 220 volts respectively. When motor element 31 predominates to move the disk 29 clockwise, an increasing area of the disk 29 will be presented adjacent its pole faces and a decreasing area adjacent the pole faces of motor element 30. Consequently, motor element 31 will be rendered more effective in its predominance and the effect of motor element 30 decreased. The disk 29 will therefore be quickly moved to circuit opening position and more of the disk 29 will be adjacent the pole faces of motor element 31 and less adjacent the pole faces of motor element 30. Consequently voltage $x$ will have to increase appreciably and voltage $y$ decrease accordingly in order that motor element 30 may predominate to move the disk 29 to circuit closing position. In order to insure that the disk 29 may not move to circuit closing position until after the disk 23 has moved to circuit opening position, I construct the motor elements 30 and 31 so that with the disk 29 in circuit opening position, the circuit voltage vector must reach a position $e_4$ such as, for example, substantially quadrature or 90 degrees from phase coincidence where voltages $x$ and $y$ are substantially equal, before motor element 30 can predominate to move the disk 29 to circuit closing position. The particular position of $e_4$ is immaterial, the main requisite in the illustrated embodiment of the invention being that the position of the circuit voltage vector where motor element 30 predominates to move disk 29 to circuit closing position should be in phase displacement subsequent to the position $e_3$ where motor element 24 predominates to move the disk 23 to circuit opening position. In a practical embodiment of my invention, the values of the voltages $x$ and $y$, corresponding to the position $e_4$ of the circuit-voltage vector, are each substantially 150 volts. When motor element 30 predominates to move the disk 29 to circuit closing position, the disk will remain substantially in this position until the circuit voltage vector reaches the position $e_2$ when motor element 31 will again predominate and move the disk 29 to circuit opening position as heretofore set forth. Thus, as circuit voltage vector moves to and away from phase coincidence through the range of phase difference from $e_2$ to $e_4$, the disk 29 will be in circuit opening position while the range of phase difference from $e_4$ through phase opposition to $e_2$, the disk 29 will be in circuit closing position.

It will therefore be apparent that the phase relation between the alternator and bus voltages must be changing at less than a predetermined rate in order that the disk 23 may have time to move to circuit closing position before disk 29 is moved to circuit opening position. Moreover, the range of phase difference over which both the disks 23 and 29 may simultaneously be in circuit closing position is limited and consequently the control circuit 6 can be completed only during a limited number of degrees before synchronism and not after. This allows somewhat for the time required to close the circuit controlling means 3. It is, of course, assumed that the voltages of the alternator 2 and bus 1 are equal so that contacts 14 and 15 remain closed. If these voltages are not equal one or the other of the contacts 14 and 15 will be opened in consequence of the differential action of the motor elements 36, 37 on the disk 35 and therefore the control circuit 6 will be held open even though the alternator voltage has the same frequency as, and is in phase with, the bus voltage. It is therefore clear that the control circuit 6 controlling the operation of closing the circuit controlling means 3 can be closed only when the voltages of the alternator 2 and the bus 1 are substantially alike in phase, frequency, and value. It is moreover clear from Fig. 2 and the explanation therewith that contacts 13, which open just before synchronism remain open until 90 degrees or more after synchronism since motor element 31 of relay 17 tends to predominate until the voltage $e$ is substantially 90 degrees beyond phase coincidence.

While my invention has been illustrated and described as applied to a synchronizing apparatus, it will be readily understood that it is not limited thereto but is susceptible of many other uses. I therefore aim to cover by the appended claims all modifications which are within the true spirit and scope of my invention.

What I claim as new and desire to secure by Letters Patent of the United States is:—

1. A relay comprising a rotatable armature, a plurality of motor elements associated with said armature for inducing currents therein to control the movement thereof, one of said elements comprising an energizing winding and being adapted irrespective of the direction of current flow in its winding to exert a torque on said armature tending to turn the same in one direction, and another of said elements comprising an energizing winding and being adapted irrespective of the direction of current flow in its winding to exert a torque on said armature tending to turn the same in the opposite direction, said armature upon movement thereof in response to a difference between said torques being adapted to increase the effect of the element exerting the greater torque.

2. A relay comprising a rotatable armature, a plurality of motor elements associated with said armature for inducing currents therein to control the movement thereof, one of said elements comprising an energizing winding and being adapted irrespective of the direction of current flow in its winding to exert a torque on said armature tending to turn the same in one direction, and another of said elements comprising an energizing winding and being adapted irrespective of the direction of current flow in its winding to exert a torque on said armature tending to turn the same in the opposite direction, said armature upon movement thereof in response to a difference between said torque being adapted to decrease the effect of the element exerting the smaller torque.

3. A relay comprising a rotatable armature, a plurality of motor elements associated with said armature for inducing currents therein to control the movement thereof, one of said elements comprising an energizing winding and being adapted irrespective of the direction of current flow in its winding to exert a torque on said armature tending to turn the same in one direction, and another of said elements comprising an energizing winding and being adapted irrespective of the direction of current flow in its winding to exert a torque on said armature tending to turn the same in the opposite direction, said armature upon movement thereof in response to a difference between said torques being adapted to increase the effect of the element exerting the greater torque and to decrease the effect of the element exerting the smaller torque whereby the predominant torque element is rendered more effective to produce a quick movement of said armature.

4. An induction relay comprising, a rotatable disk, electroresponsive means for controlling the direction of rotation of said disk comprising a plurality of electromagnetic shaped pole torque producing elements each comprising an energizing winding and having poles inductively associated with the disk, said elements being arranged to exert opposing torques on said disk irrespective of the directions of current flow in the windings thereof, the material of said disk being so disposed relatively to the poles of said motor elements that movement of the disk in either direction in response to a difference between said torques increases the effect of the element exerting the greater torque and decreases the effect of the element exerting the smaller torque whereby the predominant torque element is rendered more effective to produce a quick movement of said disk.

In witness whereof, I have hereunto set my hand this 12th day of June, 1925.

OLIVER C. TRAVER.